A. H. HIEATZMAN.
GAS SUPPLYING SYSTEM FOR AUTOMOBILE ENGINES.
APPLICATION FILED APR. 12, 1918.
1,405,918.
Patented Feb. 7, 1922.
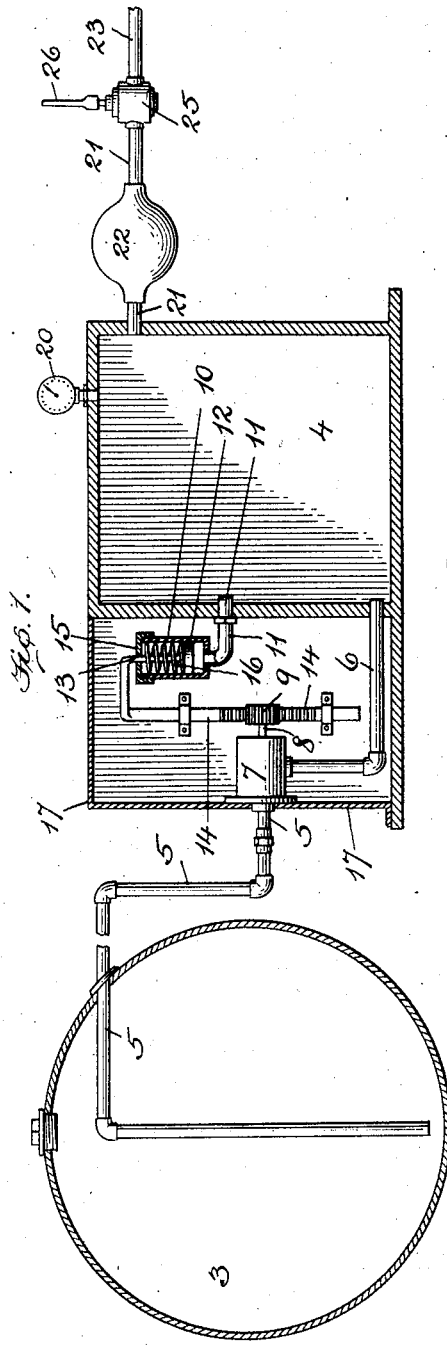
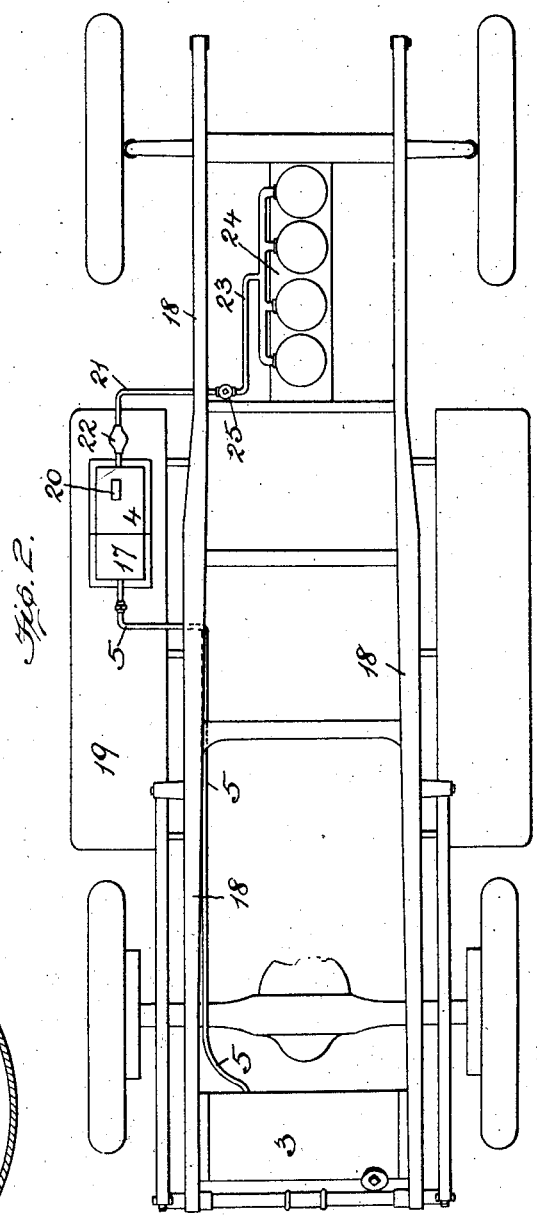
Inventor
Arthur H. Hieatzman
By Mann & Co.
Attorneys.

UNITED STATES PATENT OFFICE.

ARTHUR H. HIEATZMAN, OF BALTIMORE, MARYLAND, ASSIGNOR OF TWO-FIFTHS TO WILLIAM C. LUDWIG, OF BALTIMORE, MARYLAND.

GAS-SUPPLYING SYSTEM FOR AUTOMOBILE ENGINES.

1,405,918. Specification of Letters Patent. Patented Feb. 7, 1922.

Application filed April 12, 1918. Serial No. 228,247.

*To all whom it may concern:*

Be it known that I, ARTHUR H. HIEATZMAN, a citizen of the United States, residing at Baltimore, in the State of Maryland, have invented certain new and useful Improvements in Gas-Supplying Systems for Automobile Engines, of which the following is a specification.

This invention relates to improvements in gas supplying-systems for automobile engines.

One object of the invention is to provide improved means for carrying on an automobile, artificial or natural gas and which will automatically feed the gas at substantially a uniform predetermined pressure to the intake of the engine.

Another object of the invention is to provide improved means whereby a fluid fuel, of artificial or natural gas, may be stored under comparatively great pressure in a main reservoir, then drawn from the main to an auxiliary reservoir in which latter the fuel will be maintained under a much reduced pressure, and to provide improved means that is controlled by the pressure in the auxiliary reservoir to automatically effect the transfer of the fuel and to maintain the same in the auxiliary reservoir at a substantially uniform pressure.

With these, and other objects in view, the invention is illustrated in the accompanying drawings, wherein,—

Fig. 1, shows the improved device in a diagrammatic manner, and

Fig. 2, illustrates an application of the device to the chassis of an automobile.

Referring to the drawing, and particularly Fig. 1, thereof, the numeral 3, designates a main reservoir and 4, an auxiliary reservoir. The relative positions of these reservoirs is immaterial to the invention, but I provide for establishing communication between them in the present instance, through pipes 5 and 6. A valve casing 7, is interposed between the two pipes 5 and 6, said casing contains a valve whose stem 8, is shown projecting from one end of casing and carrying a pinion 9. By rotating the pinion and valve-stem, the valve in the casing 7, may be opened or closed so as to establish or cut off communication between the main and auxiliary reservoirs through pipes 5 and 6. The casing and its valve, therefore may be termed a control means between the two reservoirs, so that passage of fluid fuel or gas from the main reservoir 3, to the auxiliary reservoir 4, will be governed by the said control means.

Under my system, I make use of the pressure in the auxiliary reservoir to automatically effect an operation of the control means, and in this way, I control the greater pressure in the main reservoir by a lesser pressure that is in the auxiliary reservoir, as will presently be more fully explained.

In practice, the main reservoir, 3, will contain the stored-up gas under considerable pressure, and this stored-up gas will be drawn upon, from time to time, to supply the auxiliary reservoir. The gas in the auxiliary reservoir furnishes the supply for operating the engine of the automobile, while the control means, that is interposed between the two reservoirs automatically operates to replenish the auxiliary reservoir supply, and to furnish the gas from the latter reservoir at a much reduced pressure, and a pressure under which it is practicable to supply it to the intake of the engine to form a charge for the latter, as will now be explained.

A cylinder 10, is provided in the present instance, at one side of, but exterior to the auxiliary reservoir, 4, and one end of this cylinder is connected by a pipe 11, that enters said reservoir. It is thus to be understood that the interior of the cylinder 10, and the interior of the auxiliary reservoir 4, are always in communication. A piston or equivalent movable device 12, is provided in the cylinder so as to be subject, on one side to the pressure that is in the auxiliary reservoir and on the other side to a spring pressure, presently to be explained. A stem 13, is connected with the piston and projects from one end of the cylinder, and in the present instance, this stem is connected to a rack-bar 14, that meshes with the pinion 9, on the end of valve-stem 8.

The outer end of the cylinder 10, is provided with a cap 15, which has a central opening through which the stem 13, projects, and a coiled spring 16, encircles the stem and is confined in the cylinder between the cap and piston whereby to exert its pressure on the piston. The pressure of the spring may be varied by adjusting the cap on the upper end of the cylinder 10, which adjustment effects an expansion or contraction of the spring and thereby increases or decreases its force on the piston 12. In the absence of pressure in the auxiliary reservoir 4, the spring 16, will depress the piston and also impart a like movement to the rack-bar 14. As the rack-bar is engaged with the pinion 9, its downward movement is designed to rotate the said pinion and stem 8, and thereby effect an opening of the valve in the casing 7.

When the valve in casing 7, is open, gas from the main reservoir 3, will pass through pipe 5, to and through the casing 7, to pipe 6, and discharge from the latter pipe into the auxiliary reservoir 4. The gas pressure in the auxiliary reservoir will then build up and act upon the under side of the piston or movable device 12. When this pressure on the reservoir side of the piston exceeds the pressure of the spring 16, the piston will move outwardly in the cylinder and cause a movement of the rack-bar and pinion in a direction to close the valve in the casing 7, and thereby cut off further passage of gas from the main reservoir to the auxiliary reservoir.

When the pressure in the auxiliary reservoir is depleted or drops sufficiently on the inner side of the piston to be overcome by the spring on the outer side of the piston, then the piston will move inward and thereby cause the rack to operate the pinion to again open the valve in the casing 7, and permit additional gas to pass from the main reservoir to the auxiliary reservoir.

It is thus to be understood that the passage of the gas from the main reservoir to the auxiliary reservoir is permitted or cut off, according to the pressure in the auxiliary reservoir and that the means for controlling the communication between the two reservoirs is both adjustable and entirely automatic in its operation.

By means of this arrangement of reservoirs and automatic control means between them, the pressure in the auxiliary reservoir will always be reduced to a point at which it is practicable to supply it to the engine, no matter whether the pressure of the gas in the main reservoir is considerable or is nearly depleted.

As each engine, even of the same make, has its own peculiarities in operation, necessitating a slightly greater or lesser pressure in one than in another, these variations can be effected by increasing or diminishing the tension on the spring 16, in cylinder 10. This adjustment being readily effected by means of the adjusting cap 15, on the top of the spring, whereby to increase or decrease the pressure on the outer side of the piston 12.

I prefer to enclose the cylinder 10; rack-bar 14; valve casing 7, and pinion 8, by a hood or casing 17.

In practice the main reservoir 3, may be sustained at the rear of the automobile frame or chassis 18, while the auxiliary reservoir 4, and the control means may be carried on one of the running boards 19; the piping 5, from the main reservoir to the valve casing, being suitably sustained from the frame, as shown in Fig. 2, of the drawing.

A gage 20, may be provided on the auxiliary reservoir, and a pipe 21, with an expansion bag or chamber 22, is also employed to convey the gas from the auxiliary reservoir to the intake pipe 23, of the engine 24. A valve 25, is provided to control the passage of gas from the auxiliary reservoir to the engine intake, and a control-rod 26, serves to actuate said valve.

Having described my invention, what I claim is,—

1. The combination with a reservoir, of a connection with said reservoir for constantly supplying a gas fuel to said reservoir; a valve device in said connection; an outlet connection from the reservoir to a point of use,—said reservoir being of a considerably greater capacity than and interposed between the two connections whereby to form an intermediate gas-supply and temporary storage receptacle for the gas; a cylinder containing a piston; connections between the cylinder and the reservoir which latter connections are separate from and independent of the supply and outlet connections of the reservoir; and means actuated by the said piston and connected to the said valve in the supply connection whereby to operate the valve by the variations in pressure in the intermediate reservoir.

2. The combination with supply-pipe connections, of a valve in said connections; an outlet pipe connection; a reservoir of considerably greater capacity than either of said pipe connections and interposed between the two to form an intermediate storage reservoir; a pipe separate and independent of the said supply and outlet connections said pipe having one end communicating with the said reservoir; a cylinder communicating with the other end of said separate pipe; a piston in said cylinder and having a stem projecting from the latter and means exterior to the reservoir and the supply and outlet connections and connected to the valve in the supply connection for operating the latter as the piston is moved.

In testimony whereof I affix my signature.

ARTHUR H. HIEATZMAN.